United States Patent
Yamamoto

(10) Patent No.: US 6,343,094 B1
(45) Date of Patent: Jan. 29, 2002

(54) SPREAD SPECTRUM SIGNAL RECEIVING METHOD AND APPARATUS FOR CDMA CELLULAR COMMUNICATION

(75) Inventor: Hirohiko Yamamoto, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/235,415

(22) Filed: Jan. 22, 1999

(51) Int. Cl.$^7$ .......................... H04B 1/69; H04B 1/707; H04B 7/216; H04L 27/14

(52) U.S. Cl. .................. 375/152; 375/136; 375/140; 375/343; 370/335; 708/300; 708/319

(58) Field of Search ................ 375/343, 142, 375/143, 147, 150, 152, 140, 334, 335, 235; 370/335, 342, 320; 708/300, 313, 319

(56) References Cited

U.S. PATENT DOCUMENTS

| | | | |
|---|---|---|---|
| 5,293,398 A | | 3/1994 | Hamao et al. |
| 5,623,485 A | | 4/1997 | Bi |
| 5,659,574 A | | 8/1997 | Durrant et al. |
| 5,926,512 A | * | 7/1999 | Shou et al. .................. 375/343 |
| 5,974,038 A | * | 10/1999 | Shou et al. .................. 370/335 |
| 6,240,081 B1 | * | 5/2001 | Khalona .................... 370/342 |
| 6,252,899 B1 | * | 6/2001 | Zhou et al. ................. 375/140 |

OTHER PUBLICATIONS

Nakamura et al., *Configuration and characteristics Estimation of a W–CDMA systems for Third Generation Mobile Communications*, Proc. IEEE Vehicular Technology Conference (VTC'98), pp973–977, May, 1998.

Matsuyama et al., *A Performance of W–CDMA demodulator with matched filter*, (Japanese), IEICE conference '97, B–5–11, Apr. 1997.

S. Seo et al., *SIR measurement scheme using pilot symbols for transmit power control of DS–CDMA* (Japanese), Technical Report of IEICE RCS96–74, Aug. 1996.

* cited by examiner

Primary Examiner—Chi Pham
Assistant Examiner—Dung X. Nguyen
(74) Attorney, Agent, or Firm—Robert D. Varitz, PC

(57) ABSTRACT

An improved filter for use in a CDMA receiver having an RF front end for splitting a received signal into I and Q components, A/D converters for converting the I and Q components into I and Q digital components, a control processor for controlling the receiver, a system clock and a power supply, the improved filter including a matched filtering mechanism, wherein each filter includes: a separation mechanism to separate a digital I signal and a digital Q signal into MSB and LSB signal components; a MSB sub-portion having multiple MSB delay elements, a multiplier associated with each delay element, and a MSB adder for processing said MSB signal components; a LSB sub-portion having multiple LSB delay elements, a multiplier associated with each delay element, and a LSB adder for processing said LSB signal components, wherein said LSB sub-portion has fewer delay elements than said MSB sub-portion; a third adder for adding said processed MSB and LSB signal components to provide a filter output; and a half clock generator for supplying a half-clock signal to said LSB portion. A method of filtering a digital signal in a CDMA receiver includes dividing a digitized signal into MSB and LSB components; processing the MSB components with a first predetermined number of delay and multiplication operatives; and processing the LSB components with a second predetermined number of delay and multiplication operative, wherein the second predetermined number is less than the first predetermined number.

13 Claims, 4 Drawing Sheets

US 6,343,094 B1

SPREAD SPECTRUM SIGNAL RECEIVING METHOD AND APPARATUS FOR CDMA CELLULAR COMMUNICATION

RELATED APPLICATIONS

This application is related to U.S. patent application Ser. No. 09/015,424, filed Jan. 29, 1998 for "System and Method for CDMA Channel Estimation", and to U.S. patent application Ser. No. 09/048,240, filed Mar. 25, 1998 for "Pilot Aided, Time-Varying Finite Impulse Response, Adaptive Channel Matching Receiving System and Method".

FIELD OF THE INVENTION

This invention relates to Code Division Multiple Access (CDMA) signal reception in cellular communication, and more specifically to a simplified matched filtering method and system, which requires less energy than known systems.

BACKGROUND OF THE INVENTION

In general, Code Division Multiple Access (CDMA) receivers, as shown in FIG. 1, generally at 10, as used for cellular communication, include a radio frequency (RF) front end 12, an analog-to-digital (A/D) converter 14, and a base-band signal processor 16. Base-band signal processor 16 further includes matched filters 18, 20, which provide filtered output signals to a control processor 26, which in turn provides a signal 28 to a RAKE receiver 30. Control processor 26 also generates a number of control signals, which will be described later herein. Such CDMA receivers are, of course, battery powered, generally by rechargeable batteries. Providing a CDMA receiver that uses a minimal amount of power, and therefore has an extended battery life between charges is desirable.

In one type of prior art system, an input signal 32 is amplified, down-converted from RF frequency to IF, or base-band frequency, and then split into an in-phase signal (I) and quadrature-phase signal (Q) in RF front end 12, as shown in FIG. 1. I signal 36 is an input to A/D converter 14a while Q signal 38 is an input to A/D converter 14b. The split signals are converted from analog to digital signal by A/D converter 14 so that multiple bits represent the base band signal strength and the polarity. Digital I signal 36D and digital Q signal 38D are the input of matched filters 18, 20, respectively, and also RAKE receiver 30 in base-band signal processor 16.

Each matched filter, such as filter 18, shown in FIG. 2, includes a multiplier portion, shown generally at 40, an adder portion 42, and a shift register 44. Shift register 44 includes a number of delay elements, 46–54. The number of delay elements in the matched filters is determined by the sample rate, i.e. multiplication of the number of chips per symbol and the number of samples per chips. Each output of the delay element is the input of consecutive delay element, and also it is multiplied by the coefficient, $C_0$-$C_N$, determined by the spreading sequence provided from the outside of the matched filter and summed for computing the correlation of the predetermined sequence.

The other prior art system is Exclusive-OR operation to the shift register output and the coefficient. The output of the adder is the output of the matched filter, and the I and Q matched filter outputs are applied to determine the receiving path characteristics, such as signal strength, phase, and delay in the control processor. The control processor assigns the delay amount to each finger of the RAKE receiver to demodulate the path, based on the information from matched filter output. RAKE receiver performs despreading and coherent detection, and outputs the received data stream, and the data stream is processed to obtain the needed data. The "power and clock source" supplies the needed power and clock to all blocks. In both types of systems, the matched filters require considerable power, and tend, therefor, to decrease battery life.

However, known systems do not describe a method or structure to reduce the current consumption in the matched filter. Particularly, the prior art does not teach or suggest how to reduce the current consumption in the matched filter when the matched filter output is applied to compute the signal-to-noise ratio and the amount of delay for the RAKE fingers.

U.S. Pat. No. 5,293,398, to Hamoa et al., granted Mar. 8, 1994, for "Digital Matched Filter," describes a filter system where different bits of a received signal are converted into a multi-bit signal and are input into different correlators in a digital matched filter, which is used as a correlator in a receiver in an spread spectrum communications (SSC) system. After having weighted correlation outputs, the different weighted correlation outputs are added together and weighting factors are varied, depending on a synthesized correlation output obtained by addition. In this system the correlators are constructed similarly to one another and are driven by the same clock rate as the remainder of the system.

U.S. Pat. No. 5,623,485, to Bi, granted Apr. 22, 1997, for "Dual Mode Code Division Multiple Access Communication System and Method," describes a CDMA communication system capable of operating at higher data rate with fewer bit errors and reduced co-channel interference, which facilitates coherent detection without the use of a pilot signal. The system includes a transmitter and a receiver. The communication system may be used as a forward and/or received communications link in a cellular telephone system. The CDMA signal receiver includes matched filters which detects the signal spread by PN sequence and Walsh sequence, and the matched filter output is applied to computing the channel estimates for coherent decoding.

U.S. Pat. No. 5,659,574, to Durrant et al. granted Aug. 19, 1997 for "Multi-Bit Correlation of Continuous Phase Modulated Signal," describes a technique for demodulating continuous phase modulation (CPM) spread spectrum signals and variations. A plurality of A/D converters in a receiver quantitize the demodulated signals into multi-bit digital signals prior to correlation. Multi-bit correlators operate on the multi-bit digital signals to produce correlation signals that are combined to form a unified correlation signal for detection. A receiver splits into two signals and correlates a plurality of chip sequence (e.g., I and Q), ultimately combining the result into a unified correlation.

Nakamura et al., *Configuration and characteristics Estimation of a W-CDMA systems for Third Generation Mobile Communications,* Proc. IEEE Vehicular Technology Conference (VTC'98), pp973–977, May, 1998, describes a wide-band CDMA system to evaluate the performance of a total mobile communications system.

Matsuyama et al., *A Performance of W-CDMA demodulator with matched filter,* (Japanese), IEICE conference '97, B-5-11, Apr. 1997, describes performance characteristics of a wide-band CDMA demodulator.

S. Seo et al., *SIR measurement scheme using pilot symbols for transmit power control of DS-CDMA* (Japanese), Technical Report of IEICE RCS96 –74, Aug. 1996, describes a DS-CDMA system which is responsive to traffic levels and distance to station.

SUMMARY OF THE INVENTION

An improved filter for use in a CDMA receiver having an RF front end for splitting a received signal into I and Q components, A/D converters for converting the I and Q components into I and Q digital components, a control processor for controlling the receiver, a system clock and a power supply, the improved filter including a matched filtering mechanism, wherein each filter includes: a separation mechanism to separate a digital I signal and a digital Q signal into MSB and LSB signal components; a MSB sub-portion having multiple MSB delay elements, a multiplier associated with each delay element, and a MSB adder for processing said MSB signal components; a LSB sub-portion having multiple LSB delay elements, a multiplier associated with each delay element, and a LSB adder for processing said LSB signal components, wherein said LSB sub-portion has fewer delay elements than said MSB sub-portion; a third adder for adding said processed MSB and LSB signal components to provide a filter output; and a half clock generator for supplying a half-clock signal to said LSB portion. A method of filtering a digital signal in a CDMA receiver includes dividing a digitized signal into MSB and LSB components; processing the MSB components with a first predetermined number of delay and multiplication operatives; and processing the LSB components with a second predetermined number of delay and multiplication operative, wherein the second predetermined number is less than the first predetermined number.

An object of the invention is to provide a method and apparatus to reduce current consumption of a matched filter mechanism applied to a CDMA receiver with small performance degradation.

Another object of the invention is to provide a method and apparatus to reduce the complexity of a matched filter mechanism applied to a CDMA receiver.

Another object of the invention is to provide a method and apparatus to reduce the gate count of a matched filter mechanism applied to a CDMA receiver with small performance degradation.

Another object of the invention is to provide a method and apparatus that turns off portions of a CDMA circuit according to the received signal quality.

A further object of the invention is to provide a CDMA receiver wherein a number of delay elements in each correlator is different, and wherein each correlator is driven by different clock rate.

A further object of the invention is to provide a CDMA receiver wherein the signal-to-noise ratio is computed from the matched filter output and it is utilized to determine whether or not to turn off part of the matched filter.

Another object of the invention is to provide a CDMA receiver wherein a multiple bit signal is split and input to two different correlators, and the number of delay elements in each matched filter is different each other, and that each matched filter is driven by different clock rate.

These and other objects and advantages of the invention will become more fully apparent as the description which follows is read in conjunction with the drawings.

DETAILED DESCRIPTION OF THE PREFERRED EMBODIMENT

The invention achieves its objectives by separating multiple output bits of an A/D converter into most significant bits (MSBs) and least significant bits (LSBs). The MSBs are input to a first shift register, and the LSBs are input to a second shift register. Shift registers are also referred to herein as correlators. The second shift register has fewer delay elements than the first shift register. This configuration reduces the complexity and the gate count in a matched filter. Moreover, the delay elements for LSBs are driven at a lower clock rate than are the delay elements for MSBs. This results in the less current consumption. Additionally, the clock, or the power source, to a portion of the matched filter may be turned off if the received signal-to-interference ratio (SIR) or received Eb/IO is high. This occurs when a mobile set is used near a base station and received signal level is high. This further reduces power consumption. For instance, a SIR threshold of 3dB may be selected, such that the selected portion of the system may be turned off upon receipt of a "high level" signal having a SIR of $\geq$ 3dB. Likewise, the receipt of such a signal will indicate that the system is "near" a station.

Finally, the number of delay elements provided in each correlator is different, and each correlator is driven by different clock rate. A multiple-bit signal is split and input to two different correlators, and the number of delay elements in each matched filter is different. This also results in the reduction of the current consumption.

Figure 1:
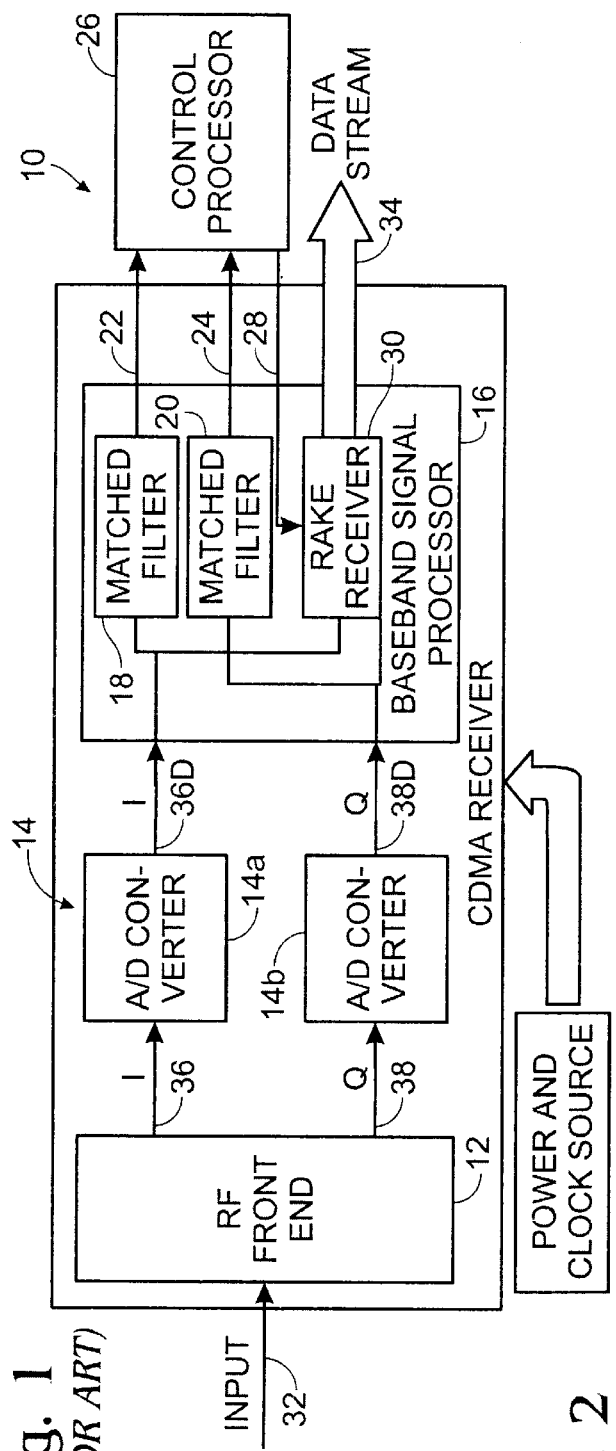
FIG. 1 is a block diagram of a portion of a prior art CDMA receiver.
Figure 2:
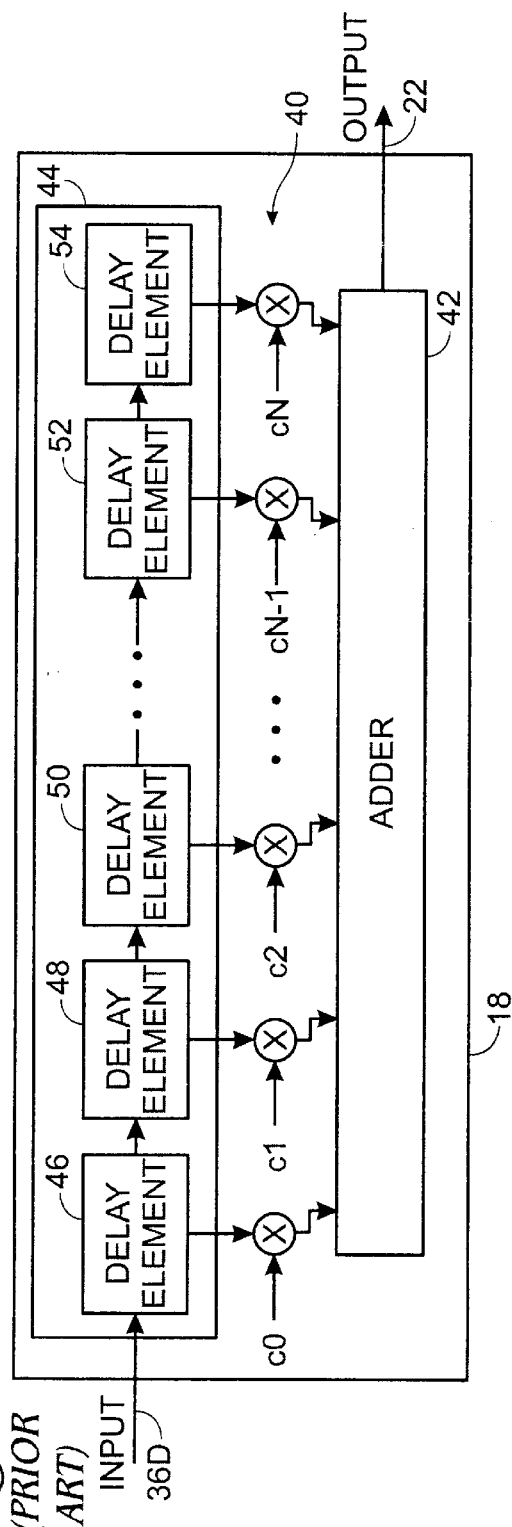
FIG. 2 is a block diagram of a portion of a prior art filter used in a CDMA receiver.
Figure 3:
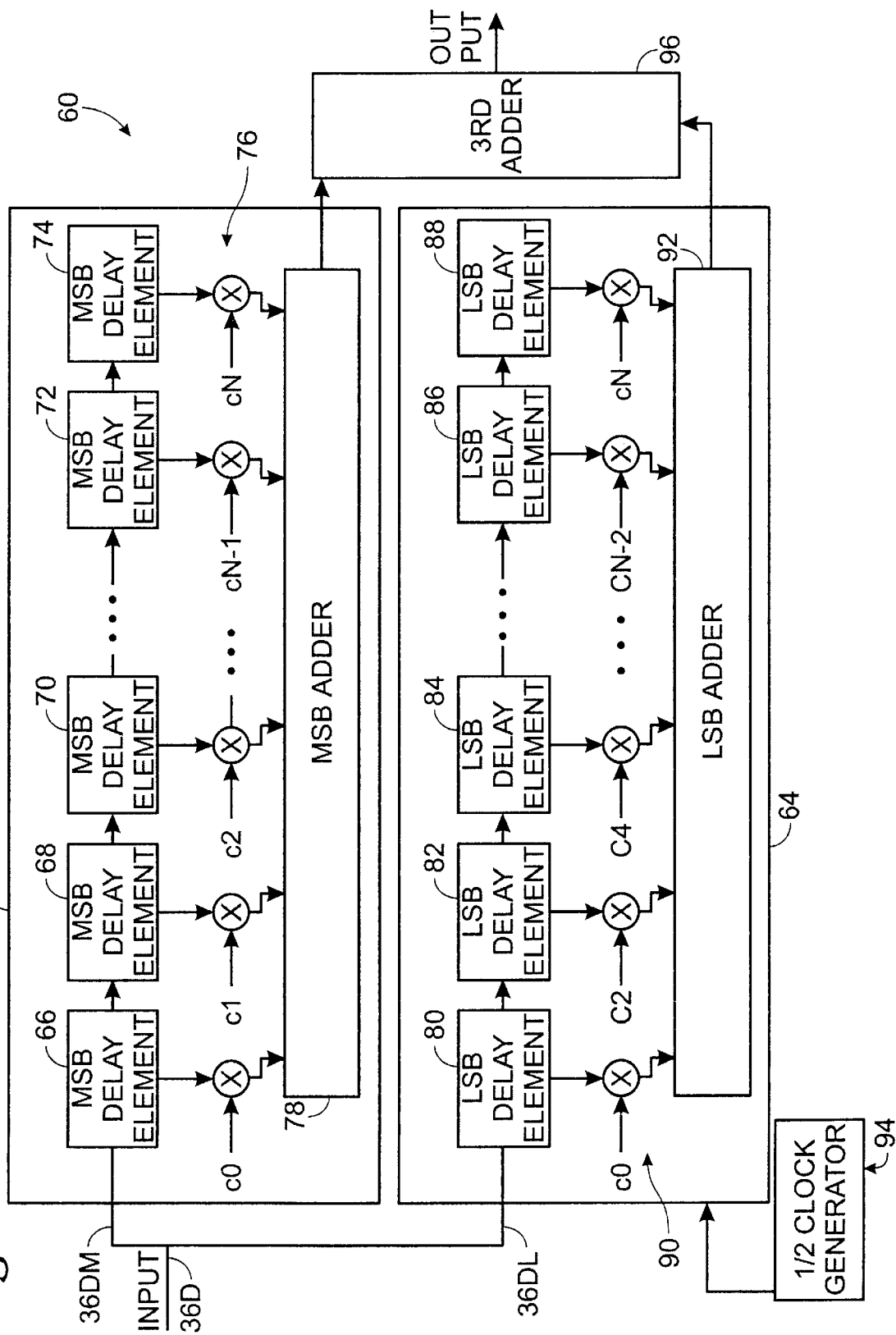
FIG. 3 is a block diagram of a portion of a first embodiment of a CDMA receiver constructed according to the invention.

FIG. 3 depicts a first preferred embodiment of the matched filter mechanism of the invention, generally 60. The matched filter is applied to the CDMA receiver as in the prior art to derive the path characteristics. Filter 60 includes a MSB portion 62 and an LSB portion 64. MSB portion 62 further includes delay elements 66–74, corresponding multipliers, shown generally at 76, and a MSB adder 78. Delay elements 66–74 and multipliers 76 provide a predetermined number of delay and multiplication operatives on the signals. LSB portion 64 further includes delay elements 80–88, corresponding multipliers, shown generally at 90, and a LSB adder 92. A half clock generator 94 operates on a signal from a system clock (not shown) as will be described later herein. A third adder 96 combines the output signals from adders 78 and 92. Where components from prior art systems are used, they are indicated by like reference numerals as used in FIGS. 1 and 2.

In FIG. 3, a digital signal, such as digital in-phase signal 36D is separated into MSB and LSB components, 36DM and 36DL, respectively. The number of bits of the input of the matched filter is assumed to be four for purposes of explanation, however, the actual number of bits has no limitation. The input signal is separated by an A/D converter into 1 sign bit, 2 upper half (most significant) bits (MSBs) and 1 lower half (least significant) bit (LSB). Each bit, including the sign bit, is the input of the respective shift register. There are fewer LSB delay elements than MSBs delay elements, typically half of the MSBs. This results in the reduction of the gate count and current consumption because gate count and current consumption of the delay element is approximately proportional to the number of processed bits. The delay element outputs for the MSBs and LSB are the input of each consecutive delay element, and also multiplied by the coefficient $C_0$–$C_N$. The multiplied results for MSBs and LSB are added in MSB adder 78 and LSB adder 92, respectively. The added results are further added by third adder 96. The output of third adder 96 is the matched filter output for filter 60. It should be noted that MSB portion 62 has N +1 delay elements, progressing from "0" to "N-1" to "N", while LSB portion 64 has fewer elements, progressing, for example, from "0" to "N-2" to "N".

Base-band block for the LSB, or LSB portion, 64, is driven by the half clock generator 94 which generates a half clock signal from a system clock. The slower clock results in less current consumption.

Multiplied coefficients $C_0$–$C_N$ are typically, but not limited to, every other predetermined coefficient used in MSBs. The performance degradation caused by the reduction of the complexity in LSB does not affect decision in control processor 26 because the output is utilized to determine only the amount of delay, and LSB output has a less significant affect on the added output of matched filter 60.

Figure 4:
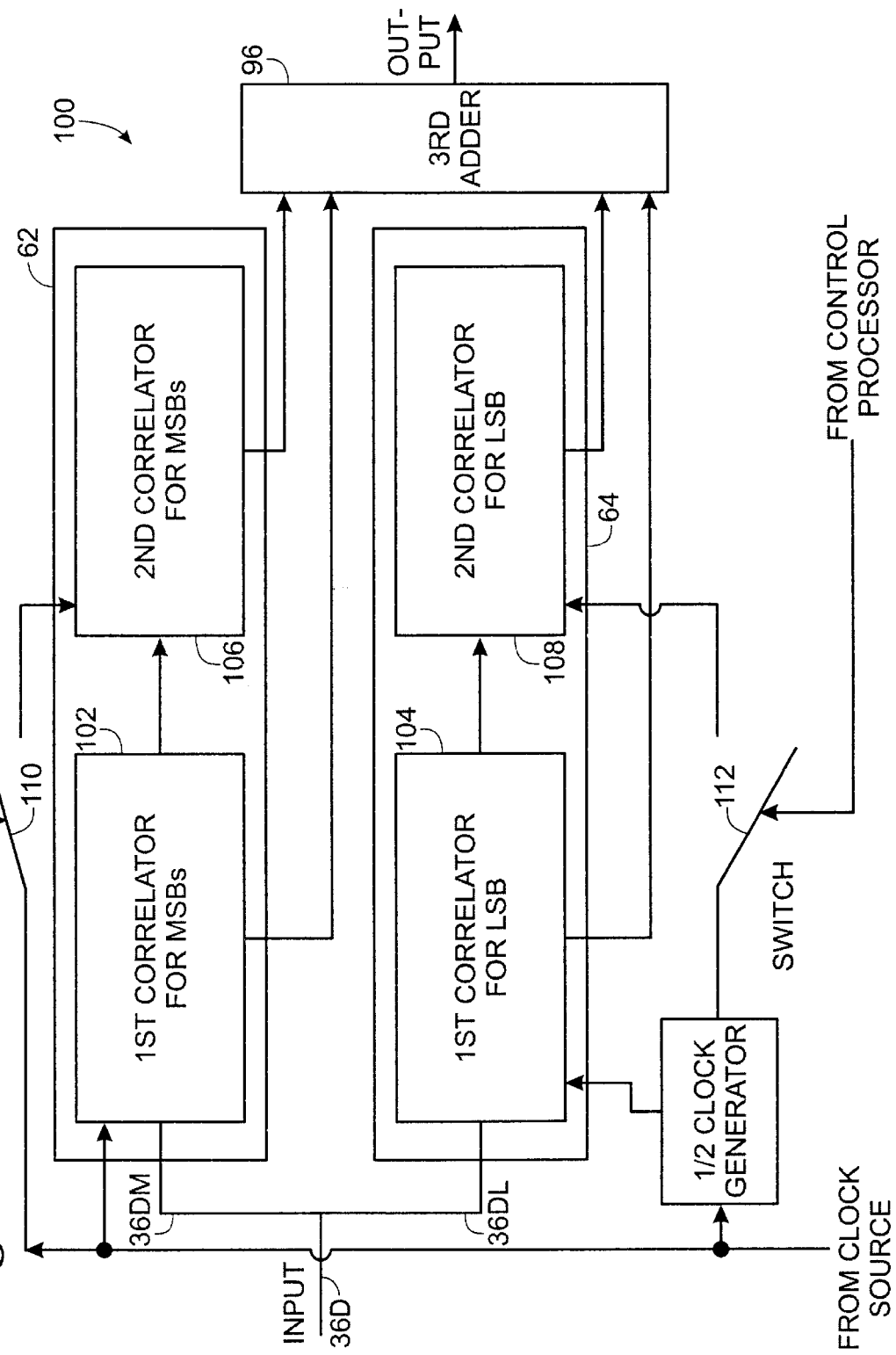
FIG. 4 is a block diagram of a portion of a second embodiment of a CDMA receiver constructed according to the invention.

FIG. 4 depicts a second embodiment of the invention, generally at 100. In this embodiment, MSB portion 62 and LSB portion 64 are split into two sub-portions, including first correlators, 102, 104, and second correlators 106, 108, respectively. Half clock generator 94 receives its signal from a system clock and provides a half-clock signal to each of the second correlators. The clock to the second correlators may be turned off by a control signal, which opens switches 110, 112, from control processor 26 when predetermined conditions exist.

In control processor 26, signal-to-interference ratio (SIR) is computed from the received signal. The control processor may be implemented by ASIC, DSP, microprocessor and so on. One may compute the SIR by the following:

$$SIR = \frac{S}{I} \quad (1)$$

$$S = \left|\frac{1}{N}\sum_{i=1}^{N} Ri\right|^2 \quad (2)$$

$$I = \frac{1}{N}\sum_{i=1}^{N} |Rav - Ri|^2 \quad (3)$$

where S represents the received signal strength, I represents the averaged interference signal strength, N is the number of matched filter output to be averaged, Ri is the complex matched filter output, and Rav is the average of Ri.

If the SIR is high, correlation peak of the matched filter is stable. In this case, low correlation peak of the matched filter will not affect the path assignment on the RAKE finger, therefore, not all of the multiplier output needs to be added. In such a case, control processor 26 turns off the clock to second correlators 106, 108. The current consumption in second correlators 106, 108 will be virtually zero, because almost no current is consumed by a typical CMOS circuit, such as generally used in an ASIC to implement the base band processor when no switching of transistor takes place. The ratio of the number of taps in the first and second correlators is a tradeoff of the current consumption and the degradation of the correlation peak of the matched filter output. A typical ratio is 1:1. The number of correlator sub-portions will also be determined by such design tradeoff.

Figure 5:
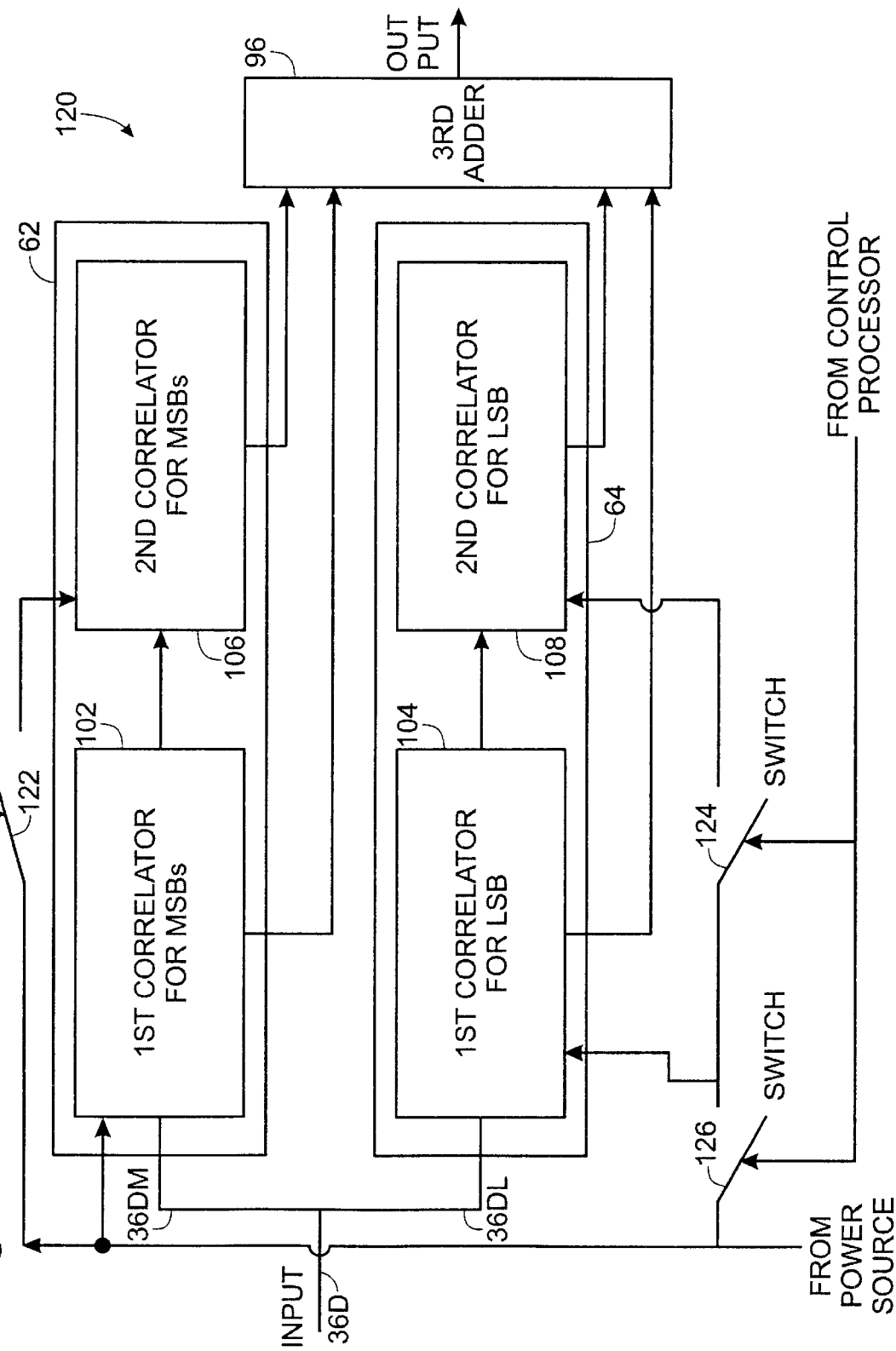
FIG. 5 is a block diagram of a portion of a third embodiment of a CDMA receiver constructed according to the invention.

FIG. 5 depicts third embodiment of the invention, generally at 120. In FIG. 5, the power supply to the second correlator sub-portions 106, 108 may be turned off by a control signal from control processor 26, which opens switches 122, 124, respectively. Control processor 26 turns off power to the second correlator sub-portions based on the signal to interference ratio. Control processor 26 may also turn off the power supply to LSB correlator sub-portion 104 when the signal to noise ratio is sufficiently high by sending a control signal to switch 126.

Thus, a matched filter mechanism and method of operating same has been disclosed which requires less complex circuitry and has a lower power consumption than CDMA systems of the prior art. Although a preferred embodiment of the invention has been disclosed, along with several variation thereof, it will be appreciated that further modifications and variations may be made thereto without departing from the scope of the invention as defined in the appended claims.

I claim:

1. In a CDMA receiver having an RF front end for splitting a received signal into I and Q components, A/D converters for converting the I and Q components into I and Q digital components, a control processor for controlling the receiver, a system clock and a power supply, an improved filter comprising:
    a matched filtering mechanism, wherein each filter includes:
        a separation mechanism to separate a digital I signal and a digital Q signal into MSB and LSB signal components;
        a MSB sub-portion having multiple MSB delay elements, a multiplier associated with each delay element, and a MSB adder for processing said MSB signal components;
        a LSB sub-portion having multiple LSB delay elements, a multiplier associated with each delay element, and a LSB adder for processing said LSB signal components, wherein said LSB sub-portion has fewer delay elements than said MSB sub-portion;
        a third adder for adding said processed MSB and LSB signal components to provide a filter output; and
    a half clock generator for supplying a half-clock signal to said LSB portion.

2. The improved filter of claim 1 wherein said MSB sub-portion and said LSB sub-portion each includes a first correlator portion and a second correlator portion, and which further includes a switch located between said half clock generator and said second correlator portions, and wherein the control processor analyzes a SIR based on the received signal, and wherein the control processor generates a control signal when the SIR is high to open said switch thereby halting processing in said second correlators.

3. The improved filter of claim 1 wherein said MSB sub-portion and said LSB sub-portion each include a first correlator portion and a second correlator portion, and which further includes a first switch located between the power supply and said second correlator portions, and wherein the control processor analyzes a SIR based on the received signal, and wherein the control processor generates a control signal when the SIR is high to open said first switch thereby halting processing in said second correlators.

4. The improved filter of claim 3 which further includes a second switch located between the power supply and said LSB first correlator, and wherein the control processor generates a signal to open said second switch when the received signal is high.

5. A method of filtering a digital signal in a CDMA receiver comprising:
    dividing a digitized signal into MSB and LSB components;

processing the MSB components with a first predetermined number of delay and multiplication operatives; and processing the LSB components with a second predetermined number of delay and multiplication operative, wherein the second predetermined number is less than the first predetermined number.

6. The method of claim 5 which includes halting the processing of signal components upon occurrence of a predetermined SIR condition.

7. The method of claim 6 wherein said halting includes stopping a clock signal to the LSB components.

8. The method of claim 6 wherein said halting includes cutting power to the LSB components.

9. The method of claim 6 wherein said halting includes stopping the clock signal to a portion of the MSB components.

10. In a CDMA receiver having an RF front end for splitting a received signal into I and Q components, A/D converters for converting the I and Q components into I and Q digital components, a control processor for controlling the receiver, a system clock and a power supply, an improved filter comprising:
 a matched filtering mechanism, wherein each filter includes:
  a separation mechanism to separate a digital I signal and a digital Q signal into MSB and LSB signal components;
  a MSB sub-portion having multiple MSB delay elements, a multiplier associated with each delay element, a MSB adder for processing said MSB signal components, and a first MSB correlator portion and a second MSB correlator portion;
  a LSB sub-portion having multiple LSB delay elements, a multiplier associated with each delay element, a LSB adder for processing said LSB signal components, wherein said LSB sub-portion has fewer delay elements than said MSB sub-portion, and a first LSB correlator portion and a second LSB correlator portion;
  a third adder for adding said processed MSB and LSB signal components to provide a filter output; and
 a half clock generator for supplying a half-clock signal to said LSB portion.

11. The improved filter of claim 10 which further includes a switch located between said half clock generator and said second correlator portions, and wherein the control processor analyzes a SIR based on the received signal, and wherein the control processor generates a control signal when the SIR is high to open said switch thereby halting processing in said second correlators.

12. The improved filter of claim 10 which further includes a first switch located between the power supply and said second correlator portions, and wherein the control processor analyzes a SIR based on the received signal, and wherein the control processor generates a control signal when the SIR is high to open said first switch thereby halting processing in said second correlators.

13. The improved filter of claim 12 which further includes a second switch located between the power supply and said first LSB correlator, and wherein the control processor generates a signal to open said second switch when the received signal is high.

* * * * *